US008624961B2

(12) United States Patent
Li

(10) Patent No.: US 8,624,961 B2
(45) Date of Patent: Jan. 7, 2014

(54) METHOD AND DEVICES FOR 3-D DISPLAY BASED ON RANDOM CONSTRUCTIVE INTERFERENCE

(76) Inventor: Zhiyang Li, Wuhan (CN)

( * ) Notice: Subject to any disclaimer, the term of this patent is extended or adjusted under 35 U.S.C. 154(b) by 654 days.

(21) Appl. No.: 12/865,809

(22) PCT Filed: Jan. 23, 2009

(86) PCT No.: PCT/CN2009/000112
§ 371 (c)(1),
(2), (4) Date: Aug. 2, 2010

(87) PCT Pub. No.: WO2009/097746
PCT Pub. Date: Aug. 13, 2009

(65) Prior Publication Data
US 2010/0328433 A1    Dec. 30, 2010

(30) Foreign Application Priority Data
Feb. 3, 2008  (CN) .......................... 2008 1 0046861

(51) Int. Cl.
*H04N 13/02*    (2006.01)
*H04N 13/00*    (2006.01)
(52) U.S. Cl.
CPC ....... *H04N 13/0239* (2013.01); *H04N 13/0055* (2013.01)
USPC ................ 348/46; 348/42; 348/43; 348/44; 348/45; 348/47; 348/48; 348/49; 348/50; 348/51; 348/52; 348/53; 348/54; 348/55; 348/56; 348/57; 348/58; 348/59; 348/60; 359/290; 359/276; 345/103; 345/424; 345/419; 382/154
(58) Field of Classification Search
USPC ............... 348/42–60; 359/290, 276; 345/103, 345/424, 419; 382/154
See application file for complete search history.

(56) References Cited

U.S. PATENT DOCUMENTS 5,497,189 A * 3/1996 Aritake et al. ................. 348/51
6,094,294 A * 7/2000 Yokoyama et al. ........... 359/290

(Continued)

FOREIGN PATENT DOCUMENTS

| CN | 1462895 A | | 12/2003 |
|---|---|---|---|
| CN | 1570704 A | | 1/2005 |
| CN | 1932565 | * | 3/2007 |
| CN | 1932565 A | | 3/2007 |
| CN | 200962160 Y | | 10/2007 |
| CN | 101226325 A | | 7/2008 |
| CN | 201199289 Y | | 2/2009 |
| JP | 11234705 A | | 8/1999 |

OTHER PUBLICATIONS

PCT International Search Report; Chinese PCT Application No. PCT/CN2009/000112; May 7, 2009; 6 pgs.
PCT Written Opinion of the International Searching Authority; Chinese PCT Application No. PCT/CN2009/000112; May 7, 2009; 6 pgs.

*Primary Examiner* — Dave Czekaj
*Assistant Examiner* — Shanika Brumfield
(74) *Attorney, Agent, or Firm* — Conley Rose, P.C.; J. Robert Brown, Jr.

(57) ABSTRACT

The present invention relates to a method and an apparatus for 3-D display based on random constructive interference. It produces a number of discrete secondary light sources by using an amplitude-phase-modulator-array, which helps to create 3-D images by means of constructive interference. Next it employs a random-secondary-light-source-generator-array to shift the position of each secondary light source to a random place, eliminating multiple images due to high order diffraction. It could be constructed with low resolution liquid crystal screens to realize large size real-time color 3-D display, which could widely be applied to 3-D computer or TV screens, 3-D human-machine interaction, machine vision, and so on.

11 Claims, 9 Drawing Sheets

(56) References Cited

U.S. PATENT DOCUMENTS

| | | |
|---|---|---|
| 6,247,816 B1 | 6/2001 | Cipolla et al. |
| 6,377,295 B1 * | 4/2002 | Woodgate et al. .............. 348/59 |
| 6,961,045 B2 * | 11/2005 | Tsao ............................. 345/103 |
| 7,150,531 B2 * | 12/2006 | Toeppen ......................... 348/51 |
| 2002/0122254 A1 * | 9/2002 | Gluckstad ..................... 359/276 |
| 2006/0120595 A1 * | 6/2006 | Nakamura et al. ............ 382/154 |
| 2006/0209066 A1 * | 9/2006 | Kubara et al. ................. 345/424 |
| 2006/0290777 A1 * | 12/2006 | Iwamoto et al. ................ 348/49 |
| 2009/0322738 A1 * | 12/2009 | Cable ............................ 345/419 |

* cited by examiner

METHOD AND DEVICES FOR 3-D DISPLAY BASED ON RANDOM CONSTRUCTIVE INTERFERENCE

CROSS-REFERENCE TO RELATED APPLICATIONS

This application is a filing under 35 U.S.C. 371 of International Application No. PCT/CN2009/000112 filed Jan. 23, 2009, entitled "Three-Dimensional Displaying Method and Apparatus Based on Random Constructive Interference" claiming priority to Chinese Application No. 200810046861.8 filed on Feb. 3, 2008, which these applications are incorporated by reference herein in their entirety.

FIELD OF THE INVENTION

The present invention relates to methods and apparatuses for 3-D display and 3-D photography based on random constructive interference. The invention could be used as computer or TV screens, for intelligent human-machine interaction and machine vision etc., in such field as education, scientific research, entertainment, advertisement and so on.

BACKGROUND OF THE PRESENT DISCLOSURE

Large size real-time 3-D display with wide viewing angle has long been dreamed of. We may classify existing 3-D display techniques roughly into two classes, pseudo 3-D display and true 3-D display. In pseudo 3D-display various means are employed to present respectively to two eyes of an observer two pictures being taken at slightly different angles. The observer combines the two pictures and forms a virtual 3-D image in his/her mind. In true 3-D display a real 3-D image is created in space, like what happens in holographic display. To watch pseudo 3-D display one has to wear some kind of auxiliary apparatuses like polarization spectacles, or the eye position of an observer has to be tracked, limiting the number of observers to one or a few more. For true 3-D display observers need not wear any auxiliary apparatus and could watch a displayed 3-D image conveniently as if they watch a real object.

For the past decades with the development of liquid crystal display (LCD), people tried to replace hologram plates with liquid crystal panels and succeed in real-time holographic 3-D display for very small objects. However even for projection type liquid crystal panels the pixel pitch is usually more than ten micrometers, in other words the space resolution is less than one hundred line pairs per millimeter, which is nearly two orders lower than that of a hologram plate. Therefore the holographic 3-D images generated so far by using projection type liquid crystal panels were as small as one centimeter so that very low density interference patterns were involved. At the same time the created holographic 3-D images were far away from the liquid crystal panels, yielding a very narrow viewing angle.

For conventional liquid crystal computer screens the pixel pitches increase to about 0.29 mm, which means the resolutions are only several line pairs per millimeter. It is impossible to generate 3-D holographic images with such low resolution liquid crystal screens. In addition to produce a large size holographic 3-D image with wide viewing angle large space-bandwidth product is necessary. At present, liquid crystal panels could only provide a space-bandwidth product around $10^6$, several orders lower than what is necessary. To make things worse with the increase of space-bandwidth product huge data becomes inevitable, which puts a great burden on real time data processing.

SUMMARY OF THE PRESENT INVENTION

The first aim of the present invention is to provide a method based on random constructive interference for fast and stable large size 3-D display using two-dimensional display devices with low resolution and relatively low space-bandwidth product. The second aim of the present invention is to provide a method for 3-D photography which is capable of measuring and recording 3-D positions and color information of real objects, and is widely applicable to human-machine interaction, machine vision, and so on.

The third aim of the present invention is to provide an apparatus for large size and wide viewing angle real-time color 3-D display for computer and TV screens, which could make use of existing LCD technique and could shift between 3-D and 2-D display easily.

For these purposes the present invention provided following solutions.

A 3-D display method based on random constructive interference comprising following steps:

A: Decompose a 3-D image into discrete pixels;

B: Pick one of the pixels;

C: Select randomly coherent secondary light sources from a coherent secondary light source array in which the positions of the secondary light sources are of a uniform random distribution, the number of randomly selected secondary light sources being proportional to the intensity of the pixel picked up in step B;

D: For each coherent secondary light source selected in step C calculate its distance to the pixel picked up in step B and the related phase difference, and take the phase difference as the phase adjustment that should be performed by the coherent secondary light source to generate the said pixel;

E: For each coherent secondary light source selected in step C set the amplitude adjustment it should make to generate the pixel picked up in step B as a constant or proportional to the intensity of the pixel;

F: For each discrete pixel obtained in step A, repeat step B through step E, record the amplitude and phase adjustment that should be made by each coherent secondary light source for each discrete pixel; for each coherent secondary light source, in way of complex-amplitude addition, sum up all the recorded amplitude and phase adjustment it should make to generate the said pixels, and take the amplitude and phase of resulting complex amplitude as the total amplitude and phase adjustment it should make;

G: For each coherent secondary light source calculate its final phase adjustment by subtracting its primary phase from the total phase adjustment determined in step F and use the total amplitude adjustment determined in step F as its final amplitude adjustment; let each coherent secondary light source with random position distribution produce the final phase and amplitude adjustment.

A method for 3-D photography based on random constructive interference, comprising following steps:

A: Following the 3-D display method based on random constructive interference, generate light spots in 3-D space using a coherent secondary light source array in which the positions of secondary light sources are of a uniform random distribution.

B: Focus a conventional camera on the position of the light spots generated in step A and record an image;

C: Repeat step A through step B so that the light spots generated in step A scan through a 3-D space, meanwhile analyze the images taken in step B; the positions of the light spots represent the local 3-D coordinates of the surface when their image sizes become minima; meanwhile the color and brightness of the surface of the object being the same as recorded by the conventional camera.

A 3-D display device based on random constructive interference comprising: a coherent light source that emits coherent light; an illuminating optic system disposed to receive the coherent light and emit an expand coherent light beam; an amplitude-phase-modulator-array disposed to receive the expand coherent light beam and to produce a secondary light source array; a random-secondary-light-source-generator-array disposed and aligned with the amplitude-phase-modulator-array so that one random-secondary-light-source-generator receives the light from one amplitude-phase-modulator in the amplitude-phase-modulator-array and creates a new coherent secondary light source array in which the positions of the secondary light sources are of a uniform random distribution.

The said amplitude-phase-modulator-array comprising: the first polarizer disposed to receive the expanded light beam from illuminating optic system and to emit a polarized light beam; the first beam splitter disposed to receive the polarized light beam and to split it into two equal light beams; two reflectors disposed to receive the two equal light beams and reflect them normally onto two transmission liquid crystal panels respectively; two transmission liquid crystal panels together with the second beam splitter disposed to form a Michelson interferometer with one transmission liquid crystal panel placed at an angle of 45 degree to the second beam splitter's half-reflect-half-transmit surface and in mirror symmetry with another transmission liquid crystal panel relative to the second beam splitters half-reflect-half-transmit surface; the second beam splitter disposed to receive the light beams modulated by two transmission liquid crystal panels and combine them to form an integrated light beam; the second polarizer disposed in parallel with one of the two liquid crystal panels to receive normally the integrated light beam formed by the second beam splitter, the polarization directions of the first and the second polarizer being arranged to set the two transmission liquid crystal panels in phase-mostly mode; a projection lens disposed to receive the polarized light emitted from the second polarizer and form a magnified real image of the two transmission liquid crystal panels.

The said random-secondary-light-source-generator-array being disposed at the image plane of the liquid crystal panels generated by the projection lens and comprising: a transparent scattering screen or a reflective scattering screen or a micro-lens-array disposed by or fabricated on a transparent plate covered with an opaque film bearing transparent micro-holes whose positions are of a uniform random distribution, the diameter of each micro-hole being smaller than the size of the images of the pixels of the liquid crystal panels, each micro-lens in the micro-lens-array being aligned with each micro-hole on the opaque film so that the optic axis of each micro-lens passes the center of the micro-hole it aligned with.

The said illuminating optic system comprising: two convex lenses with different focal lengths, the convex lens with smaller focal length being disposed to receive the light, the convex lens with larger focal length being disposed with its object focus at the image focus of the convex lens with smaller focal length to form a telescope and to emit an expanded light beam.

The said amplitude-phase-modulator-array comprising: the first polarizer disposed to receive the expanded light beam from illuminating optic system and to emit a polarized light beam; a beam splitter disposed to receive the polarized light beam and to split it into two equal light beams; two reflective liquid crystal panels or liquid crystal light valves disposed to receive normally the two equal light beams respectively and reflect them back, the reflective liquid crystal panels or liquid crystal light valves together with the beam splitter disposed to form a reflective Michelson interferometer with one reflective liquid crystal panel or one liquid crystal light valve placed at an angle of 45 degree to the beam splitter's half-reflect-half-transmit surface and in mirror symmetry with another reflective liquid crystal panel or liquid crystal light valve relative to the beam splitter's half-reflect-half-transmit surface, the beam splitter being disposed also to receive the light beams modulated by the reflective liquid crystal panels or liquid crystal light valves and combine them to form an integrated light beam; the second polarizer disposed in parallel with one of the two reflective liquid crystal panels or liquid crystal light valves to receive normally the integrated light beam formed by the beam splitter, the polarization directions of the first and the second polarizer being arranged to set two reflective liquid crystal panels or liquid crystal light valves in phase-mostly mode; an projection lens disposed to receive the polarized light emitted from the second polarizer and form a magnified real image of two reflective liquid crystal panels or liquid crystal light valves; two digital-mirror-devices disposed behind two liquid crystal light valves to project two optic images onto the back of two liquid crystal light valves respectively, the optic image projected onto the back of one liquid crystal light valve being in mirror symmetry with the optic image projected onto the back of another liquid crystal light valve relative to the beam splitter's half-reflect-half-transmit surface.

The said amplitude-phase-modulator-array comprising: a beam splitter disposed to receive the expanded light beam from illuminating optic system and to split it into two equal light beams; two optically-addressed-electro-optic-phase-modulators disposed to receive normally the two equal light beams with their electro-optic material films and reflect them back, two optically-addressed-electro-optic-phase-modulators together with the beam splitter disposed to form a reflective Michelson interferometer with one optically-addressed-electro-optic-phase-modulator placed at an angle of 45 degree to the beam splitter's half-reflect-half-transmit surface and in mirror symmetry with another optically-addressed-electro-optic-phase-modulator relative to the beam splitter's half-reflect-half-transmit surface, the beam splitter being disposed also to combine the light beams reflected and modulated by two optically-addressed-electro-optic-phase-modulators to form an integrated light beam; an optic lens disposed to receive the integrated light beam and form a magnified real image of two optically-addressed-electro-optic-phase-modulators; two digital-mirror-devices disposed behind two optically-addressed-electro-optic-phase-modulators to project two optic images onto the optic-sensitive films on the back of two optically-addressed-electro-optic-phase-modulators respectively, the optic image projected onto the back of one optically-addressed-electro-optic-phase-modulator being in mirror symmetry with the optic image projected onto the back of another optically-addressed-electro-optic-phase-modulator relative to the beam splitter's half-reflect-half-transmit surface.

The said optically-addressed-electro-optic-phase-modulator comprising: the first film of optic-sensitive material, the second film of opaque material, the third reflective film and the forth film of electro-optic material, all of them being sandwiched between two transparent conductive glasses in the given order.

The said random-secondary-light-source-generator-array comprising: two identical opaque plates bearing transparent micro-holes whose positions are of a uniform random distribution disposed at the object plane of the projection lens, one opaque plate being placed at an angle of 45 degree to the beam spider's half-reflect-half-transmit surface and in mirror symmetry with another opaque plate relative to the beam spider's half-reflect-half-transmit surface.

The said amplitude-phase-modulator-array comprising: the first polarizer; the first transmission liquid crystal panel disposed by the first polarizer; the second polarizer disposed by the first transmission liquid crystal panel; the second transmission liquid crystal panel disposed by the second polarizer; the third polarizer disposed by the second transmission liquid crystal panel, the pixels on the first transmission liquid crystal panel being aligned with the pixels on the second transmission liquid crystal panel, the polarization directions of the three polarizer being arranged to set one transmission liquid crystal panel in phase-mostly mode and another transmission liquid crystal panel in amplitude-mostly mode.

Position of pixels on the said two transmitted or reflective liquid crystal panels are of an identical uniform random distribution.

The said random-secondary-light-source-generator-array comprising: the first micro-lens-array on which the micro-lens are of a periodical distribution; the second micro-lens-array on which the micro-lens are of a uniform random distribution being disposed in parallel with the first micro-lens-array and aligned with the first micro-lens-array so that the focused light emitted from each micro-lens of the first micro-lens-array illuminates one micro-lens of the second micro-lens-array and the image focus of each micro-lens of the first micro-lens-array falls within one focal length of one micro-lens of the second micro-lens-array.

The said random-secondary-light-source-generator-array comprising: a bundle of optically isolated single-mode fibers fabricated so that the single-mode fibers within the bundle are glue together and polished at the first end and the spaces between adjacent single-mode fibers are of a random distribution at the second end; a micro-lens-array disposed to focus the light into the cores of the single-mode fibers within the bundle at the first end, one micro-lens in the micro-lens-array being aligned with one single-mode fiber.

The present invention is based on the following two facts. Firstly, a light spot, or a 3-D pixel, could be generated in free space by constructive interference of a number of coherent discrete secondary light sources. Lots of 3-D pixels make up a 3-D image. Secondly, if the positions of above coherent discrete secondary light sources are randomly located, high order diffraction could be greatly depressed so that only one 3-D image is created. Detailed explanation is given as follows.

Suppose N discrete secondary light sources are fixed on the X-Y plane, whose amplitude and phases are adjustable. For convenience of analysis, we further suppose the discrete secondary light sources are point light sources. They emit spherical light waves polarized along Y axis. Then the complex amplitude of the optic field at any position $r_m$ is a summation of the N spherical waves emitted by these N secondary point light sources and the resulting electric field component along Y axis could be described as, $$U(r_m) = \sum_{j=1}^{j=N} \frac{A_{0j} A_{cj,m} \cos(\theta_{j,m}) \exp[i(\Phi_{cj,m} + \Phi_{0j})]}{|r_m - R_j|} \quad (1)$$

$$\exp[-ik_{j,m} \cdot (r_m - R_j)]$$

where vector $R_j$, j=1, 2, . . . N stands for the coordinates of N secondary point light sources, $k_{j,m}$ for the wave vector of the light emitted from the jth secondary point light source towards $r_m$, $\theta_{j,m}$ for the angle between Y axis and the electric component of the light field emitted from the jth secondary point light source towards $r_m$, $\theta_{j,m}$<90°, $A_{0j}$ and $\Phi_{0j}$ for primary amplitude and phase of the jth secondary light source respectively. $A_{0j}$ depends on the intensity of jth secondary point light source and is also a function of direction. $A_{cj,m}$ and $\Phi_{cj,m}$ stand for additional amplitude and phase adjustment made by the jth secondary light source under electrical control. Both $A_{0j}$ and $A_{cj,m}$ are positive. To ensure constructive interference at position $r_m$ it is necessary to digitally set the phase $\Phi_{cj,m}$ of each secondary point light source so that, $$\Phi_{cj,m} + \Phi_{0j} - k_{j,m} \cdot (r_m - R_j) = 2n\pi \quad (2)$$

Where n is an integer. When Eq.(2) is satisfied, Eq.(1) becomes, $$U(r_m) = \sum_{j=1}^{j=N} \frac{A_{0j} A_{cj,m} \cos(\theta_{j,m})}{|r_m - R_j|} \quad (3)$$

Therefore the light field at position $r_m$ reaches a maximum, creating a light spot, or a 3-D pixel, in free space. The larger the number N is, the brighter and sharper the 3-D pixel is. Away from the position of $r_m$, the intensity of the light field decreases dramatically.

From Eq.(3) it could be seen that the intensities of the generated 3-D pixels depend on both the number N and the amplitude $A_{cj,m}$ of the secondary point light sources. When both N and $A_{cj,m}$ keep constant, according to Eq.(3), the intensity of a 3-D pixel is roughly in inverse proportion to the square of $|r_m - R|$. That means the larger the distance $|r_m - R_j|$ of the generated 3-D pixel from secondary point light sources is, the lower the intensity is. Since an observer stands at opposite side and faces the secondary point light sources, above fact implies that the closer the generated 3-D pixel towards the observer, the lower its intensity. However it should be noticed that the intensity calculated by Eq.(3) does not precisely represent the brightness of the generated 3-D pixel seen by the observer since not all the light emitted by N secondary point light sources could come into the eyes of an observer. To estimate how many lights could enter the eye of an observer, we may draw a cone taking observer's pupil as the bottom and the 3-D pixel as the apex and stretch the cone in opposite direction towards the secondary point light sources. It is easy to see that only the light emitted by the secondary light sources located within the cone could reach the pupil of the observer and contribute to the brightness of the 3-D pixel. Suppose the distance between the generated 3-D pixel and the observer is d, it could be found from their geometrical relation that the number $N_{eff}$ of the secondary point light sources located within the cone is in inverse proportion to the square of d and in proportion to the square of $|r_m - R_j|$. Replace N with $N_{eff}$ in Eq.(3), one could find that now the brightness of the generated 3-D pixel seen by the observer is roughly in inverse proportion to the square of d. In other words, the closer the 3-D pixel towards the observer, the brighter it appeared to the observer, which is in good agreement with our common sense. Furthermore, $A_{cj,m}$ could be adjusted to compensate for the influence of the primary amplitude $A_{0j}$ and the angle $\theta_{j,m}$ on the intensity of the generated 3-D pixel, so that it appears with the same intensity when looked from different angle.

It could be seen from Eq.(1) that such a 3-D display system is a linear system. Therefore a number of 3-D pixels could be created in free space to form a discrete 3-D image. Following above method we may indeed carry out 3-D display by utilizing each pixel of a 2-D liquid crystal screen as a discrete secondary light source. However there exists a serious problem. Along the directions of ±1, ±2 . . . order diffractions, multiple images would be generated at the same time due to periodical arrangement of the pixels. Near the screen these images overlap with each other, decreasing the image quality. Away from the screen the images make a small angle with the screen yielding a very narrow viewing angle, although they are separated from each other.

To avoid the creation of multiple images, present invention let the discrete secondary light sources locate at random positions. The images at ±1, ±2 . . . order diffraction directions disappear due to the loss of the periodicity of the positions of the secondary light sources and only one 3-D image is formed. Near the screen the image makes a very large angle with the screen yielding a very wide viewing angle.

When coherent secondary point light sources with random distribution are employed, it could be revealed using Eq.(1) that a single 3-D pixel might be created at position $r_m$. If a total of M discrete 3-D pixels need be created, denote the amplitude and phase adjustment made by the $j^{th}$ secondary light point source to create the $m^{th}$ 3-D pixel as $A_{cj,m}$ and $\Phi_{cj,m}$, the total complex amplitude adjustment that should be carried out by $j^{th}$ secondary light source should be, $$A_j = \sum_{m=1}^{m=M} A_{cj,m} \exp(\Phi_{cj,m}) \quad (4)$$

According to Eq.(1-4), Eq.(1) reaches maxima when and only when $r=r_m$, $m=1, 2, \ldots M$, since at these locations Eq.(2) is satisfied. All the 3-D pixels generated as such make up a 3-D image.

From the simulation based on Eq.(1), (2) and (4) it was found that multiple 3-D images were indeed inevitable when periodic secondary light sources were used. However, when the secondary point light sources shift randomly within a certain range around their initial periodic positions, high order diffraction images disappear gradually as the range of shift becomes large. When the range of shift reaches 90% of the initial period high order diffraction images disappear completely and only a zero order 3-D image remains. For uniform random distribution a secondary light source has the same probability to locate at any position and the periodicity could be destroyed completely. Other type of random distribution could also be adopted if high order diffraction images could be depressed.

In above analyses the secondary light sources are assumed to be point light sources. For secondary light sources with a certain size the same conclusion could be reached although the calculation becomes more complicated since the contribution of each secondary light source need be calculated by integration. It is also worth to point out that above 3-D display method is very robust. For example, if a small fraction of secondary light sources go wrong, the intensity of generated 3-D pixels would change only slightly. This is due to the fact that each 3-D pixel being a result of constructive interference of hundreds and thousands of secondary light sources. If Eq.(2) was not strictly satisfied, that is, the phase difference between two light waves arriving at a given position was not exactly multiple of $2\pi$, but with an error less than $\pi/2$, the intensity of resulting light field still become larger than individual light field. Of course the maxima are reached only when Eq.(2) is strictly satisfied. In a word, the intensity of created 3-D pixels might change slightly due to a small decrease of the number of secondary light sources, or small errors in carrying out phase and amplitude adjustment. However the position and the number of pixels of created 3-D images would not change. In contrast when a pixel in a 2-D screen goes wrong it become inaccessible forever, making the displayed scene incomplete.

A 3-D display device based on above principle comprises mainly four components, namely, an amplitude-phase-modulator-array, a random-secondary-light-source-generator-array, a coherent light source and an illuminating optic system. Detailed description is given below.

The amplitude-phase-modulator-array is responsible for producing discrete secondary light sources and carrying out independent amplitude and phase modulation for each secondary light source. An amplitude-phase-modulator-array might be constructed using liquid crystal panels. Each pixel of a liquid crystal panel acts as a secondary light source. It is known that for a single SN or other type liquid crystal panel, the amplitude adjustment and phase adjustment are usually correlated with each other. However, if the polarizer on its two sides are set to proper polarization directions a single liquid crystal panel might work in phase-mostly mode or amplitude-mostly mode. Based on this fact, simultaneous independent amplitude and phase modulation might be performed by a combination of two liquid crystal panels. One way to combine two liquid crystal panels is to place them in an order so that the illuminating light passing them in sequence. The total modulation is a vector production of the modulations made by each liquid crystal panel. Another way to combine two liquid crystal panels is to place them on the two arms of a Michelson interferometer so that the illuminating light passing them respectively and then combine together. The total modulation is a vector addition of the modulations made by each liquid crystal panel. Which way should be adopted depends on what type and what size of liquid crystal panels are used. Besides liquid crystal panels, there are also other devices to create discrete secondary light sources. For example, optically-addressed-electro-optic-phase-modulators proposed by present invention might be utilized for the purpose.

The random-secondary-light-source-generator-array is responsible for transforming the discrete secondary light sources produced by amplitude-phase-modulator-array into new secondary light sources whose positions are of a random distribution. There are various ways to create randomly located secondary light sources. A direct way is to randomly arrange the pixels when designing a liquid crystal panel. In this case, no additional random-secondary-light-source-generator-array is necessary, or the liquid crystal panel itself is a combination of an amplitude-phase-modulator-array and a random-secondary-light-source-generator-array. For existing commercial liquid crystal panels, additional random-secondary-light-source-generator-arrays have to be employed since their pixels are periodically arranged. A random-secondary-light-source-generator-array may be built with an opaque plate bearing a number of transparent holes whose positions are randomly located, or with a micro-lens-array in which the positions of the micro-lenses are randomly located, or with a micro-prism array in which the directions of the micro-prisms are randomly arranged, or a combination of them. A random-secondary-light-source-generator-array may also be built in other ways, for example by means of a bundle of fibers as proposed by present invention.

As a coherent imaging system, a 3-D display device based on random constructive interference needs a coherent laser, whose coherent length should be larger than the possible maximum optic path difference between any two secondary light sources to any 3-D pixel. The brightness and contrast of a 3-D image depends on the power of the laser. In order to display color 3-D images, lasers with different wavelengths should also be employed. When black and white liquid crystal panels are used, lasers for basic colors may be turned on and off in sequence to display color 3-D images based on persistence of vision. When color liquid crystal panels are used, all the basic colors may be turned on at the same time. Pixels covered with different color filters perform amplitude-phase modulations for different wavelengths. Therefore all the basic color images could be created at the same position and make up a true 3-D color image. For 3-D measurement and human-machine interaction, near infrared lasers might be used to avoid disturbances to the observer. Since the diameter of a primary laser beam is usually very small, an optic illuminating system is necessary to expand the laser beam. An optic illuminating system should also be thin and light for portable devices.

To improve the quality of 3-D images generated by above 3-D display devices based on random constructive interference, some auxiliary optic elements may be used. For example, a Fresnel lens may be employed to magnify a 3-D image and separate the image away from the bright secondary light sources to avoid the interference of background light to the observer.

If above 3-D display device stops amplitude and phase modulation following above random constructive interference principle, and changes mainly the intensities of secondary light sources by amplitude, 2-D images could then be displayed. In other words, a 3-D image device based on random constructive interference may shift freely between a 3-D display device and a 2-D display device under the control of software.

With the aid of a conventional camera, above 3-D display method could also be used to take 3-D images and carry out 3-D measurements. To do so one may display an array of light spots or lines in free space and let them scan in space repeatedly, meanwhile monitor where the light spots or lines touch the surface of an object with a conventional camera. The pre-known positions of the light spots or lines help to determine the coordinates of the surface of an object. Furthermore the moving direction and speed of the object could be calculated. Similarly, if we display a 3-D button in space and monitor when a finger touches the button, 3-D human machine interaction could be performed.

Present invention has following advantages compared with existing techniques:

Firstly, true 3-D images are displayed in free space. Observers may watch the image as if watching a real object without bearing any auxiliary apparatus. There is no need to track the eye position of an observer. Many observers may watch the image at the same time and change their positions as they like. Secondly, large size real-time color 3-D images could be created with wide viewing angle. Thirdly, since it is based on a principle totally different from traditional holography, no reference light is necessary and there is also no need to record high density interference patterns. As a result, it does not require dense secondary light sources and existing LCD techniques could be used. Fourthly, it is very robust. The intensity of created 3-D pixels might change slightly due to small decrease of the number of secondary light sources, or small errors in carrying out phase and amplitude adjustment. However, the positions and the number of created 3-D pixels would not change. Fifthly, it could easily shift between 2-D display and 3-D display under the control of software without any hardware change. Sixthly, it could carry out 3-D measurement and 3-D human machine interaction when cooperated with a conventional camera.

DETAILED DESCRIPTION

Figure 1:
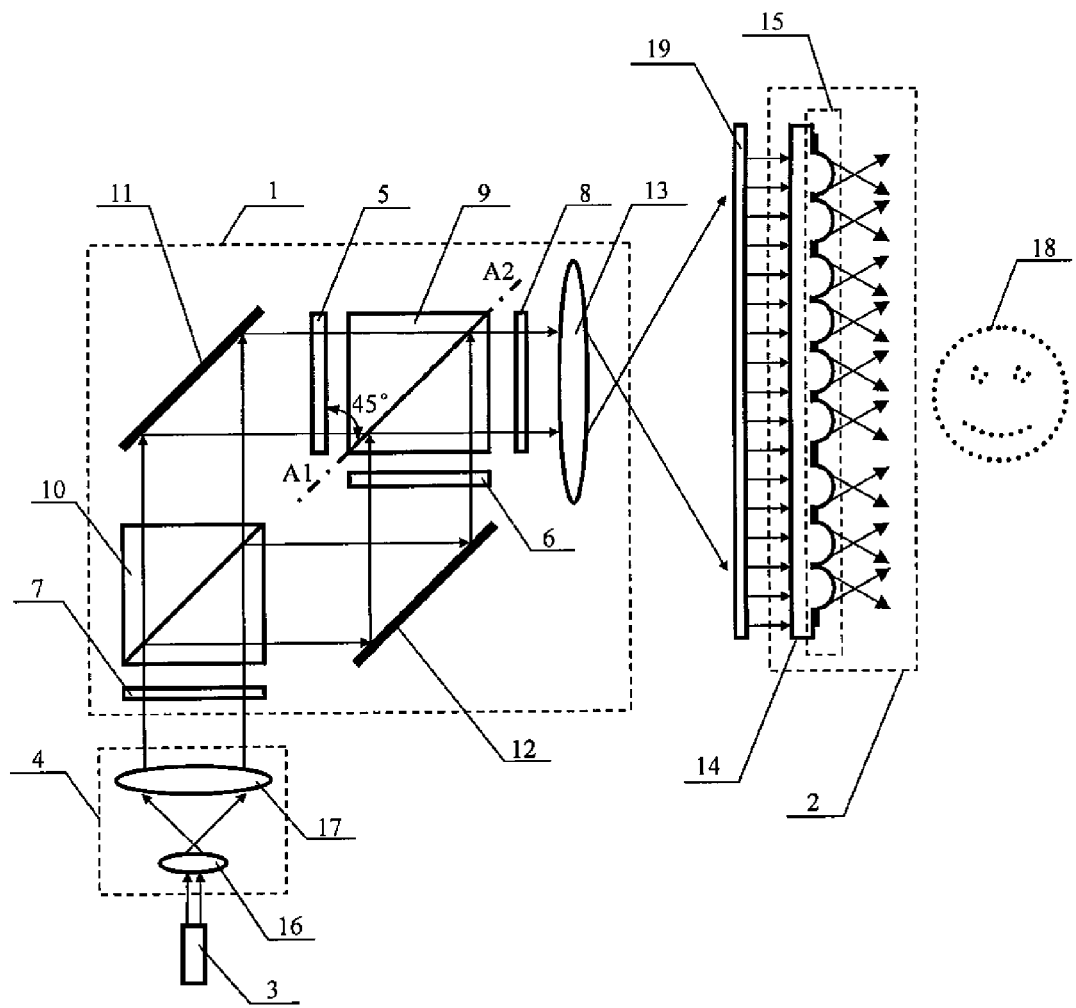
FIG. 1 is a schematic diagram of an embodiment of present invention using two small-size TFT-ST projection type liquid crystal panels.

FIG. 1 is a schematic diagram of a 3-D display device based on random constructive interference using two small-sized TFT-ST projection type liquid crystal panels. It comprises an amplitude-phase-modulator-array 1, a random-secondary-light-source-generator-array 2, a coherent light source 3 and an illuminating optic system 4. The amplitude-phase-modulator-array 1 comprises two transmission liquid crystal panels 5, 6, two polarizer 7, 8, two beam splitters 9, 10, two reflectors 11, 12 and a projection lens 13. Two beam splitters 9, 10 and two reflectors 11, 12 are disposed to form a Michelson interferometer with two transmission liquid crystal panels 5, 6 placed on the interferometer's two arms respectively. The first transmission liquid crystal panels 5 seats at an angle of 45 degree to half-reflect-half-transmit surface A1-A2 of the second beam splitter 9 and in mirror symmetry with the second transmission liquid crystal panel 6 relative to the second beam splitter 9's half-reflect-half-transmit surface A1-A2. Both transmission liquid crystal panels 5 and 6 are at a distance of one to two focal lengths away from the projection lens 13. The first polarizer 7 is placed at the entrance port of the Michelson interferometer to receive light and in parallel with the second transmission liquid crystal panel 6. The second polarizer 8 is placed at the exit port of the Michelson interferometer and in parallel with the first transmission liquid crystal panel 5. The polarization directions of the first and the second polarizer 7, 8 are arranged to set the two transmission liquid crystal panels 5, 6 in phase-mostly mode, to do so the polarization direction of polarizer 7 is rotated at an angle of 45 degree with the polarization direction of polarizer 8 (different polarization direction may be required for different type of liquid crystal panels).

The illuminating optic system 4 comprises the first optic lens 16 with smaller focal length disposed to receive the light; the second optic lens 17 with larger focal length disposed with its object focus at the image focus of the first optic lens 16 to form a telescope and to emit an expanded light beam. If a compact illuminating optic system is required, the first convex optic lenses 16 may be replaced by a concave optic lens with its object focus placed at the second optic lens 17's object focus. The parallel laser beam emitted from coherent light source 3 is first focused by the first optic lens 16 and transformed into parallel laser beam again but with larger diameter by the second optic lens 17. The expanded laser beam penetrates normally the first polarizer 7 and gets split by the first beam splitter 10 into two equal beams. After being reflected by two reflectors 11 and 12, the two equal beams penetrate normally the two transmission liquid crystal panels 5 and 6 respectively and get combined by the second beam splitter 9 to form an integrated laser beam. The integrated laser beam penetrates normally the second polarizer 8 and gets projected by the projection lens 13. Since the pixels on both transmission liquid crystal panels 5 and 6 are aligned accurately with each other and within a range of one to two focal lengths from the projection lens 13, they form enlarged real images on opaque plate 14, which bears quantities of transparent micro-holes. These overlapped images produce a secondary light source array with variable amplitude and phase in way of vector addition.

Figure 2:
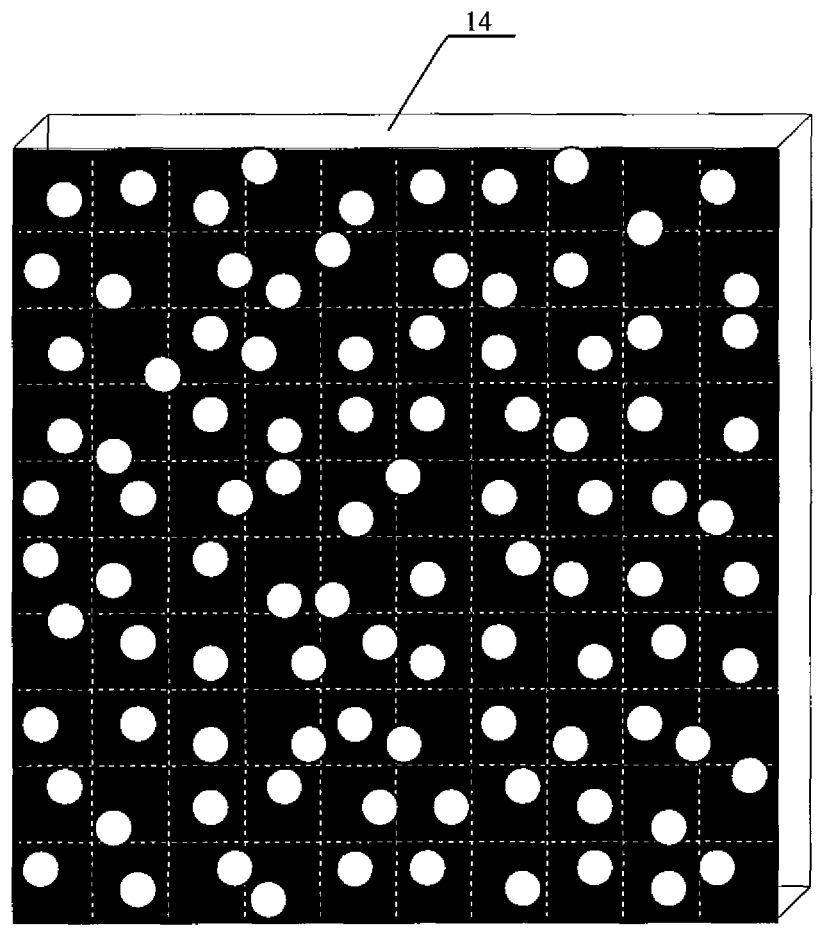
FIG. 2 is a schematic diagram of an embodiment of random-secondary-light-source-generator-array using an opaque plate bearing holes whose positions are of a random distribution.

The random-secondary-light-source-generator-array 2 in FIG. 1 comprises a micro-lens-array 15 fabricated on an opaque plate 14 bearing transparent micro-holes that are of a uniform random distribution. Each micro-lens in the micro-lens-array 15 is aligned with each micro-hole on the opaque plate 14 so that the optic axis of each micro-lens 15 passes the center of the micro-hole it aligned with. As illustrated in FIG. 2, opaque plate 14 is made by covering a transparent plate with an opaque film. The transparent micro-holes are produced by etching through the opaque film, one micro-hole for one pixel of the transmission liquid crystal panel 5 or 6. The diameter of each micro-hole is made smaller than the size of the image of the pixels of the transmission liquid crystal panels 5 or 6 (as illustrated by broken line) so that a micro-hole could move around within a certain range. The smaller the diameter of each micro-hole is, the larger the range of free movement and the larger the optic energy loss. Although the pixels of transmission liquid crystal panel 5 or 6 and their image on opaque plate 14 are of a periodic distribution, the new secondary light sources generated by micro-lens-array 15 are of a random distribution. This is because the micro-holes on opaque plate 14 are of a random distribution. The advantage to form a coherent secondary light source array by projection is that it may cover a large area which is essential for creation of large size 3-D images.

As could be seen in FIG. 1, there is an auxiliary optic element, the Fresnel lens 19, placed in front opaque plate 14. Its function is to transform divergent light into parallel light before it's incidence on opaque plate 14. As a result the focused new secondary light sources by micro-lens 15 emit symmetric divergent light, providing a better 3-D image quality for observers seating right before the device. Without Fresnel lens 19 the secondary light sources would emit asymmetric divergent light, making the 3-D image appears darker for observers seating right before the device and brighter for observers seating at a large angle with the device. Any way Fresnel lens 19 has a limited auxiliary function to improve image quality. In addition, the entrance and exit surfaces of beam splitter 9,10 and other related surfaces that may cause reflection may be evaporated with a thin anti-reflection film to depress the interference of reflected light.

Referring to the device illustrated in FIG. 1, the 3-D display method based on random constructive interference put forth by present invention may be carried out as follows. It comprises seven steps:

A: Decompose a 3-D image 18 to be displayed into M discrete pixels;

B: Pick up one pixel m from the pixels obtained in step A;

C: Select randomly N coherent secondary light sources from a coherent secondary light source array in which the positions of the secondary light sources are of a uniform random distribution, the number N depends on the intensity of the pixel m picked up in step B; The higher the intensity is, the larger the number N is;

D: For each coherent secondary light source j selected in step C, calculate its distance to the pixel m picked up in step B and the related phase difference $\Phi_{cj,\,m}=k_{j,\,m}\cdot(r_m-R_j)$, and take the phase difference $\Phi_{cj,\,m}$ as the phase adjustment that should be performed by the coherent secondary light source j to generate the said pixel m;

E: For each coherent secondary light source j selected in step C, set the amplitude adjustment $A_{cj,\,m}$ it should be made as a constant or proportional to the intensity of the pixel m picked up in step B;

F: For all the M discrete pixels in step A, repeat step B through step E, record the amplitude and phase adjustment $\Phi_{cj,\,m}, A_{cj,\,m}$, that should be made by each coherent secondary light source j for each discrete pixel m; for each coherent secondary light source j, in way of complex-amplitude addition, sum up all the recorded amplitude $A_{cj,\,m}$ and phase adjustment $\Phi_{cj,\,m}$, $$A_j = \sum_{m=1}^{m=M} A_{cj,m} \exp(\Phi_{cj,m})$$
$$= A_{cj} \exp(\Phi_{cj})$$

and take the amplitude and phase $A_{cj}, \Phi_{cj}$ of resulting complex amplitude as the total amplitude and phase adjustment it should make.

G: For each coherent secondary light source j, calculate its final phase adjustment by subtracting its primary phase $\Phi_{0j}$ from the total phase adjustment $\Phi_{cj}$ determined in step F. Of course multiples of $2\pi$ phase adjustment should be cut off. Meanwhile use the total amplitude adjustment $A_{cj}$ determined in step F as its final amplitude adjustment. Or divide the total amplitude adjustment $A_{cj}$ determined in step F by the primary amplitude $A_{0j}$ of coherent secondary light source j and multiply the result with a constant $c_1$, then use $c_1 A_{cj}/A_{0j}$ as the final amplitude adjustment to compensate for the primary amplitude $A_{0j}$ of coherent secondary light source j so that the contribution of every secondary light source become equal. Lastly drive the transmission liquid crystal panels 5 and 6 to make each coherent secondary light source j produce above final phase and amplitude adjustment.

According to the principle of coherent interference as represented by Eq.(1-4), a primary 3-D image 18 might be created following steps A through G. There is only one 3-D image 18 generated because the positions of secondary light sources are of a random distribution.

In FIG. 1, suppose the transmission liquid crystal panels 5 and 6 each contains a total of 1920×1080 pixels and the amplitude adjustment $A_{cj, m}=1$ in step E for each secondary light source in creation of one 3-D pixel. 3-D pixels with 256 gray levels might be created by changing the number N of randomly selected coherent secondary light sources in step C. Suppose we chose N=400 for the darkest 3-D pixel. When N increases by 16 times to reach N=6400, the intensity of the 3-D pixel would increase by 256 times. For average intensity we have N≈4800. That means roughly 1920×1080/4800=432 groups of pixels might be randomly selected from a total of 920×1080 pixels. If transmission liquid crystal panels 5,6 are driving with 8-bit D/As, or the maximum gray level of each pixel, also maximum value of $A_{cj, m}$ is 256, then each group of pixels could create about 256 3-D pixels and a total of about 432×256 discrete 3-D pixels might be generated. The absolute intensity of each 3-D pixel depends on the power of the laser. Very bright 3-D images may be created using high power lasers. From above estimation it could be seen that $10^6$ 3-D pixels might be generated with a space bandwidth-product of about $10^7 \sim 10^8$.

To display an extremely large 3-D scene, several 3-D display devices based on random constructive interference as illustrated in FIG. 1 might be incorporated, each creating a small part of the scene. The interfaces between each part might be made indistinguishable since they are displayed in free space away from the device.

In cooperation with a conventional camera, the device illustrated in FIG. 1 might be employed to take 3-D images and carry out 3-D measurement following the steps given below.

A: Following the 3-D display method based on random constructive interference, display light spots in 3-D space using a random coherent secondary light source array produced by a device as illustrated in FIG. 1;

B: Focus a conventional camera at the position of the light spots generated in step A and record an image;

C: Repeat step A through step B so that the light spots generated in step A scan through a 3-D space, meanwhile analyze the recorded images in step B; the positions of the light spots represent the local 3-D coordinates of the surface when their image sizes become minima; meanwhile the color and brightness of the surface of the object being the same as recorded by the conventional camera.

3-D coordinates of the entire surface of an object could be determined following above steps A-C. If large scan steps are adopted in scanning 3-D space in step A, very fast 3-D measurement speed might be achieved, while an high accuracy might be obtained if very small scan steps are adopted. If large scan steps are adopted away from the surface of an object and small scan steps are adopted near the surface by using the known information from previous scan, then both high accuracy and high speed could be attained. Above real-time 3-D measurement method might widely be applied to 3-D human-machine interaction and machine vision.

Figure 3:
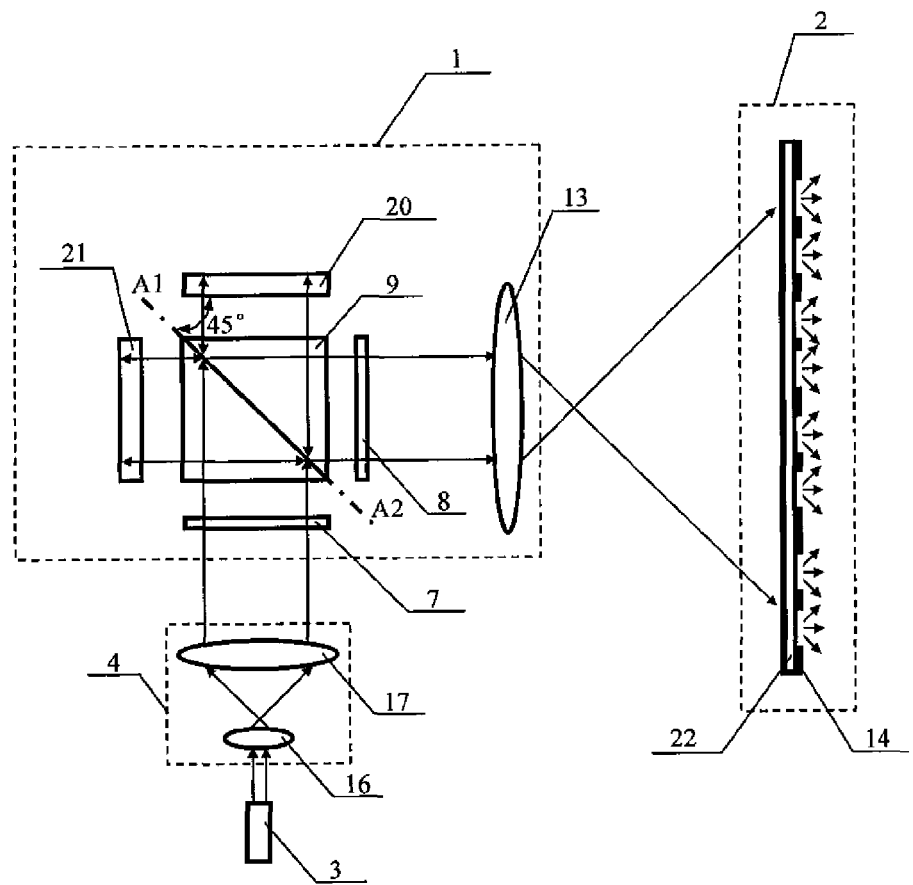
FIG. 3 is a schematic diagram of an embodiment of present invention using two reflective liquid crystal panels.

FIG. 3 is a schematic diagram of a 3-D display device based on random constructive interference using two reflective liquid crystal panels. It comprises an amplitude-phase-modulator-array 1, a random-secondary-light-source-generator-array 2, a coherent light source 3 and an illuminating optic system 4. The amplitude-phase-modulator-array 1 comprises a splitter 9, two polarizer 7, 8, a projection lens 13 and two reflective liquid crystal panels, namely liquid crystal on silicon (LCOS) 20,21. Two LCOS 20,21 together with the beam splitter 9 are disposed to form a reflective Michelson interferometer with two LCOS 20,21 at its two arms acting as the reflectors. The first reflective liquid crystal panel 20 is placed at an angle of 45 degree to beam splitter 9's half-reflect-half-transmit surface A1-A2 and in mirror symmetry with the second reflective liquid crystal panel 21 relative to beam splitter 9's half-reflect-half-transmit surface A1-A2. The device illustrated in FIG. 3 works in a similar way as the device in FIG. 1. The first polarizer 7 is placed at the entrance port of the reflective Michelson interferometer to receive light and in parallel with the first reflective liquid crystal panel 20. The second polarizer 8 is placed at the exit port of the reflective Michelson interferometer and in parallel with the second reflective liquid crystal panel 21. The polarization directions of the first and the second polarizer 7, 8 are arranged to set the two reflective liquid crystal panel 20 and 21 in phase-mostly mode, to do so the polarization direction of polarizer 7 is rotated at an angle of 45 degree with the polarization direction of polarizer 8 (different polarization direction may be required for different type of reflective liquid crystal panels). The expanded laser beam emitted from illuminating optical system 4 penetrates normally the first polarizer 7, becomes polarized laser beam and gets split by the beam splitter 9 into two equal beams. The two equal beams incident normally on the liquid crystal layers of the two reflective liquid crystal panels 20 and 21 respectively. After reflection the two equal beams get combined by the same beam splitter 9 to form an integrated laser beam. The integrated laser beam penetrates normally the second polarizer 8 and gets projected by the projection lens 13. Since the pixels on both reflective liquid crystal panels 20 and 21 are aligned accurately with each other and within a range of one to two focal lengths from the projection lens 13, they form enlarged real images on opaque plate 14, which bears quantities of transparent micro-holes. These overlapped images produce a secondary light source array with variable amplitude and phase in way of vector addition. Next the secondary light source array is transformed into a new secondary light source array with uniform random distribution by random-secondary-light-source-generator-array 2, which is made up with a transparent scattering screen 22 covered with an opaque plate 14 bearing micro-holes of uniform random distribution. The function of transparent scattering screen 22 is to make the light emitted by secondary light sources diverge greatly so that each discrete 3-D pixel is built up with lights coming from a wide range of direction and therefore could be seen from a wide range of direction, providing a wide viewing angle. The roughness of scattering screen 22 should be controlled within a proper range so that the phase difference of lights coming from different parts of the same secondary light source is very small. Otherwise they would cancel with each other, lowering the intensity of created 3-D pixels.

Figure 4:
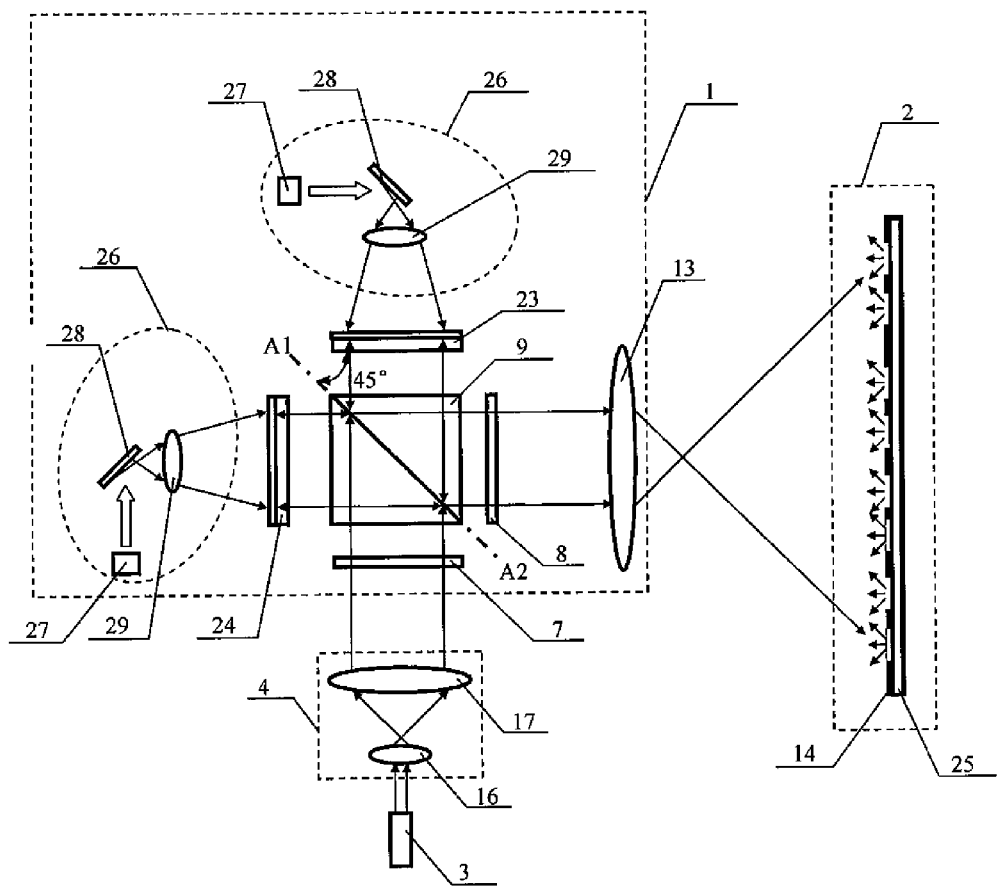
FIG. 4 is a schematic diagram of an embodiment of present invention using two liquid crystal light valves.

FIG. 4 is a schematic diagram of a 3-D display device based on random constructive interference using two liquid crystal light valves. It adopted the same optic configuration as illustrated in FIG. 3 except that two LCOS 20, 21 are now replaced by two liquid crystal light valves 23, 24 together with two digital light processors (DLP) 26. A DLP 26 comprises a light source 27, a digital micro-mirror-device 28 and an optic lens 29. The light emitted from light source 27 is reflected by digital micro-mirror-device 28 and projected onto the back of liquid crystal light valve 23 or 24 by optic lens 29 to form an image with specific intensity distribution. If only one DLP is used, a color filter is necessary to project images with different colors onto the back of liquid crystal light valves 23 and 24 respectively.

A liquid crystal light valve comprises mainly an optic-sensitive film and a liquid-crystal film. Between them there is an opaque film and a multilayer reflector. A driving voltage is applied on these films in sequence. When an optic image is projected onto the optic-sensitive film, it changes the resistance of the optic-sensitive film, which in turn changes the voltage falling on the liquid crystal film. Since the illuminating light first penetrates the liquid-crystal film, then reflected by the multilayer reflector and penetrates the liquid-crystal film again, its phase become modulated by the optic image projected on the optic-sensitive film. As the optic image consists of quantities of discrete pixels of different intensity, different parts of the liquid crystal film under different pixels receive different voltages and carry out different phase modulations. The liquid crystal film appears therefore divided into quantities of discrete pixels with the same pixel size as that of the optical image, although it is not physically divided into individual pixels in structure.

In FIG. 4, two identical DLPs 26 projects two optic images for phase modulation onto the optic-sensitive films on the back of two liquid crystal light valves 23, 24 respectively. The polarization direction of polarizer 7 is rotated at an angle of 45 degree with the polarization direction of polarizer 8 to set the liquid crystal light valves 23, 24 in phase-mostly mode (different polarization direction may be required for different type of liquid crystal light valves). Since two optic images projected onto the back of two liquid crystal light valves 23, 24 are in mirror symmetry with each other relative to beam splitter 9's half-reflect-half-transmit surface A1-A2, secondary light sources with desired amplitudes and phases are produced by vector addition on random-secondary-light-source-generator-array 2. The random-secondary-light-source-generator-array 2 is made up with a reflective scattering screen 25 covered with an opaque plate 14 bearing micro-holes with uniform random distribution. The advantage to use a liquid crystal light valve is that more gray levels and higher display frequency may be obtained with the help of DLPs so as to increase stability of color display. In addition the brightness of a 3-D image could be greatly increased by using very high power laser.

Figure 5:
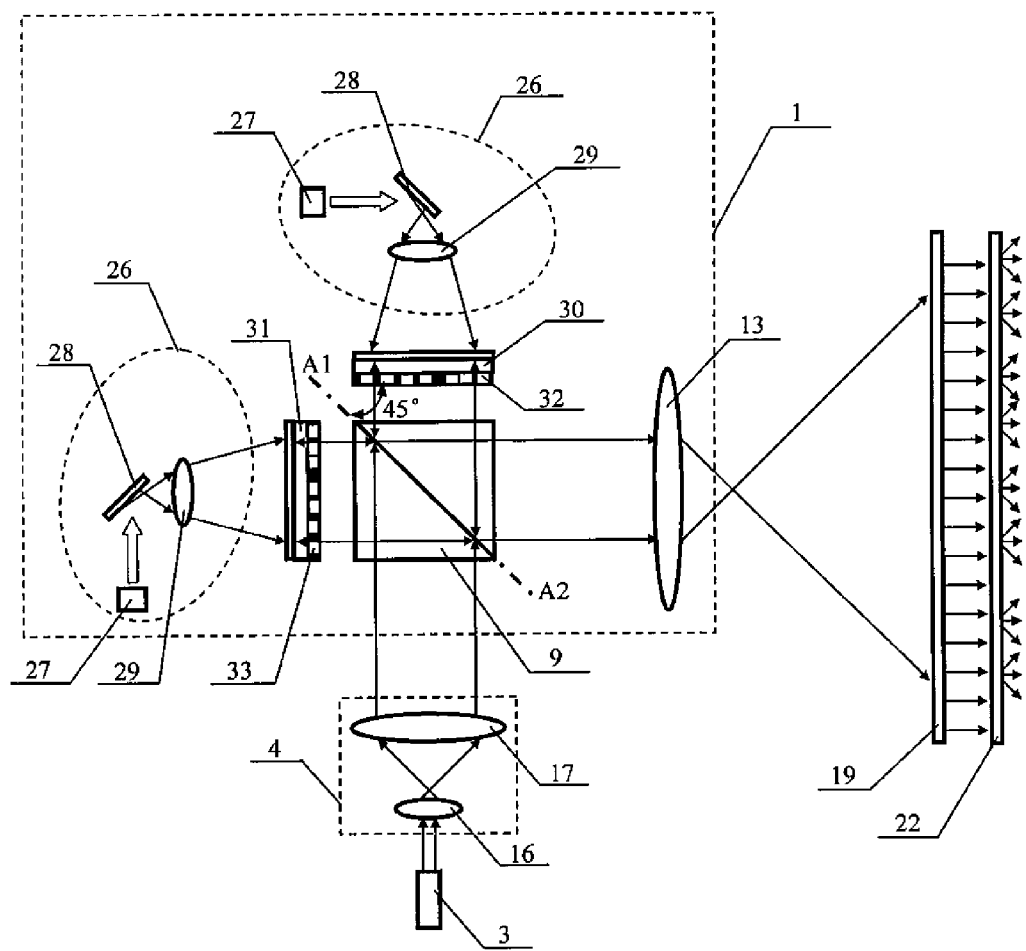
FIG. 5 is a schematic diagram of an embodiment of present invention using two optically-addressed-electro-optic-phase-modulators.
Figure 6:
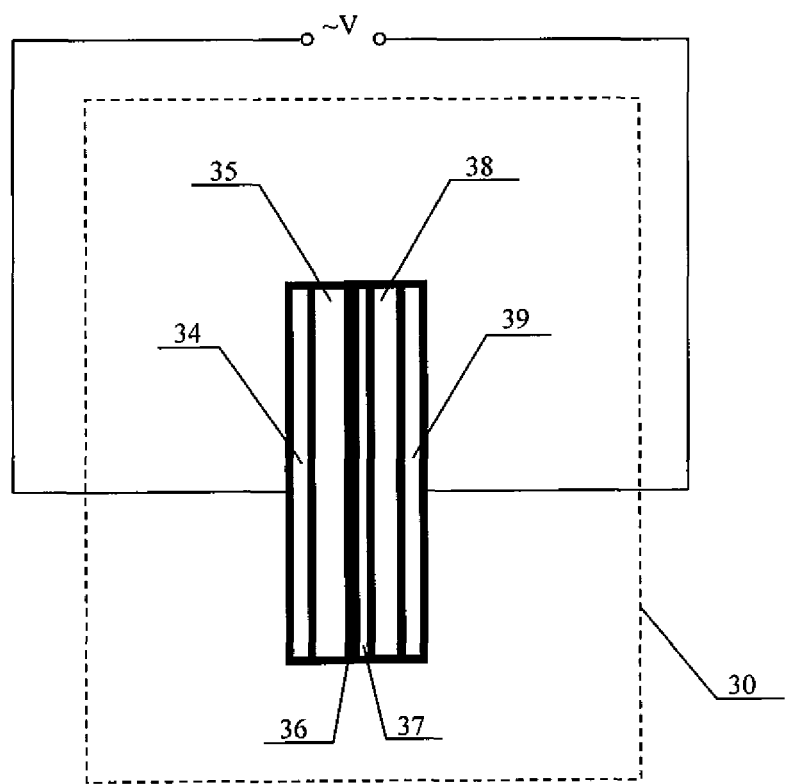
FIG. 6 is a schematic diagram of an optically-addressed-electro-optic-phase-modulator.

FIG. 5 is a schematic diagram of a 3-D display device based on random constructive interference using two optically-addressed-electro-optic-phase-modulators. Its optic configuration is the same as that in FIG. 4 except that two liquid crystal light valves 23, 24 are now replaced by two optic-addressed-electro-optic-phase-modulators 30, 31. In addition, the polarizer 7, 8 are taken away. As illustrated in FIG. 6, an optic-addressed-electro-optic-phase-modulator has similar structure as a liquid crystal light valve except that liquid crystal is replaced by electro-optic material. It comprises the first film 35 of optic-sensitive material, the second film 36 of opaque material, the third reflective film 37 and the forth film 38 of electro-optic material, all of them being sandwiched between two transparent conductive glasses 34, 39 in the given order. A driving voltage V is applied on optic-sensitive material film 35 and electro-optic material film 38 via two transparent conductive glasses 34, 39. When an optic image is projected onto the optic-sensitive film 35, it changes the resistance of the optic-sensitive film 35, which in turn changes the voltage falling on electro-optic material film 38. As a result the refractive index of the electro-optic material film 38 changes due to electro-optic effect. Since the illuminating light first penetrates electro-optic material film 38, then reflected by the reflective film 37 and penetrates the electro-optic material film 38 again, its phase becomes modulated by electro-optic material film 38. The quantity of phase modulation depends on the optic image projected on the optic-sensitive film 35. Since the voltage V is fixed and need not change precisely from time to time, very high voltage V could be applied on optic-sensitive material film 35 and electro-optic material film 38 to generate a phase change as large as π. To perform fast and accurate modulation, the respond time of optic-sensitive film 35 and its resistance relative to that of electro-optic material film 38 should be properly designed. If another reflective film were fabricated over transparent conductive glass 39, together with existing reflective film 37, a Fabry-Perot interferometer could be constructed, which is capable of carrying out amplitude modulation. Replacing liquid crystal with electro-optic material makes polarizer unnecessary and increases energy efficiency by twofold. In addition, 3-D display frequency might reach very high, because the responds time of electro-optic material may reach as short as nano-seconds.

The random-secondary-light-source-generator-array in FIG. 5 is made up with two identical opaque plates 32, 33 bearing transparent micro-holes that are of a uniform random distribution. The plates are placed on the front surfaces of the two optic-addressed-electro-optic-phase-modulators 30, 31, that is, placed on the surface facing the projection lens 13. The opaque plate 32 is placed at an angle of 45 degree to beam splitter 9's half-reflect-half-transmit surface A1-A2 and in mirror symmetry with the opaque plate 33 relative to beam splitter 9's half-reflect-half-transmit surface A1-A2. Therefore their images projected on transparent scattering screen 22 overlap and creates a random coherent secondary light source array by vector addition. The advantage to place opaque plates 32, 33 at the object plane of projection lens 13 is that the magnification ratio of projection lens 13 may change at any time without changing the size and the structure of the opaque plates. The larger the magnification ratio of projection lens 13, the larger the size of obtained coherent secondary light source array and the larger the possible size of displayed 3-D image. On the other hand, if opaque plates are placed at the image plane of projection lens 13 like what happened in FIGS. 1, 3 and 4, the size and the location of these opaque plates have to be fixed very accurately. When building a rear-projection 3-D TV, opaque plates may be placed at the image plane of projection lens 13 as shown in FIGS. 1, 3 and 4. However, when magnification ratio of projection lens 13 need change constantly, it is preferable to put the opaque plates at the object plane of projection lens 13 as shown in FIG. 5.

Figure 7:
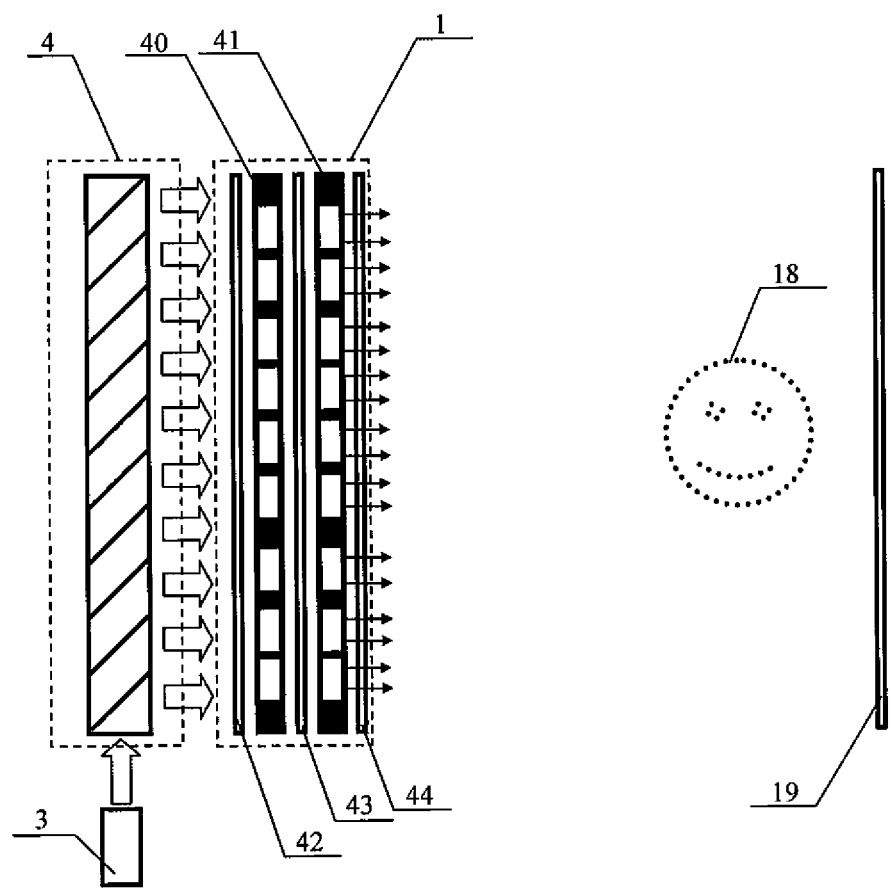
FIG. 7 is a schematic diagram of an embodiment of present invention using two large-size TFT-ST liquid crystal panels.

FIG. 7 is a schematic diagram of a 3-D display device based on random constructive interference using two large-size TFT-ST liquid crystal panels. It mainly comprises an amplitude-phase-modulator-array 1, a coherent light source 3 and an illuminating optic system 4. The amplitude-phase-modulator-array 1 comprises the first polarizer 42; the first transmission liquid crystal panel 40 disposed by the first polarizer 42; the second polarizer 43 disposed by the first transmission liquid crystal panel 40; the second transmission liquid crystal panel 41 disposed by the second polarizer 43; and the third polarizer 44 disposed by the second transmission liquid crystal panel 41. The first transmission liquid crystal panel 40 and the second transmission liquid crystal panel 41 are identical and their pixels are of a uniform random distribution. Therefore they play the functions of an amplitude-phase-modulator-array and a random-secondary-light-source-generator-array at the same time. The polarization direction of the three polarizer 42, 43, 44 are arranged to set the first transmission liquid crystal panel 40 in phase-mostly mode and the second transmission liquid crystal panel 41 in amplitude-mostly mode. In the device illustrated in FIG. 7 this was achieved by rotate the polarization direction of the first polarizer 42 at an angle of 45 degree relative to that of the second polarizer 43 and rotate the polarization direction of the third polarizer 44 at an angle of 90 degree relative to that of the second polarizer 43. For different liquid crystal panels different polarization directions should be chosen. In addition if a polarized laser beam is used, the first polarizer 42 may be omitted. In general an illuminating optic system uses two optic lenses to expand a laser beam. To obtain a compact size the illuminating optic system 4 in FIG. 7 used a stack of beam splitters instead. Along the optic path, the reflectivity of the beam splitters increase gradually, the reflectivity of the next beam splitter being the ratio of the reflectivity to the transmittance of the previous beam splitter, so that the emitted laser beams from different beam splitters are of equal intensity. The wide laser beam produced in this way penetrates the first polarizer 42, the first transmission liquid crystal panel 40, the second polarizer 43, the second transmission liquid crystal panel 41 and the third polarizer 44 in the given order, creating a secondary light source array with uniform random distribution. A primary 3-D image 18 may then be generated by adjusting the amplitudes and phases of these secondary light sources. In FIG. 7 the liquid crystal panels 40, 41 may adopt a very large size, for example, as large as 19 inches or more. When 19 inches liquid screen is used, the pixel pitch is about 0.29 mm and diffraction effect becomes negligible within a short distance. The light passing through one pixel of the first liquid crystal panel 40 would incident on the corresponding pixel of the second liquid crystal panel 41 without interfering with the adjacent pixels. However when the pixel pitch decreases, diffraction effect might grow and a 1:1 optic system or a micro-lens-array should be utilized to project the pixels of the first liquid crystal panel 40 onto the second liquid crystal panel 41.

As could be seen in FIG. 7 there is an auxiliary optic element, a Fresnel lens 19, placed on the right side of primary 3-D image 18. The primary 3-D image 18 is within one focal length of Fresnel lens 19, while the secondary light source array generated on the right surface of the second liquid crystal panel 41 is more than double focal lengths away from Fresnel lens 19. As a result a magnified virtual image of the primary 3-D image 18 is produced on the left side of Fresnel lens 19 and a real shrunk image of secondary light source array is created on the right side of Fresnel lens 19. The separation of the final 3-D image from the bright secondary light source array may greatly depress the disturbance of the bright secondary light source array to the observer and increase the contrast of the final 3-D image.

In FIGS. 1, 3, 4 and 5, the secondary light sources are generated by vector addition. Assuming the amplitude of the illuminating laser beam for each phase-modulator being 1 unit, the maximum amplitude of the secondary light source generated by vector addition may reach 2 units, yielding an intensity of 4 units. While in FIG. 7 the secondary light sources are generated by vector production. Again assuming the amplitude of the illuminating laser beam being 1 unit, the maximum amplitude of the secondary light source generated by vector production may reach 1 unit, yielding an intensity of 1 unit. In other words, a 3-D image displayed by vector addition might be four times bright than the same 3-D image displayed by vector production.

Figure 8:
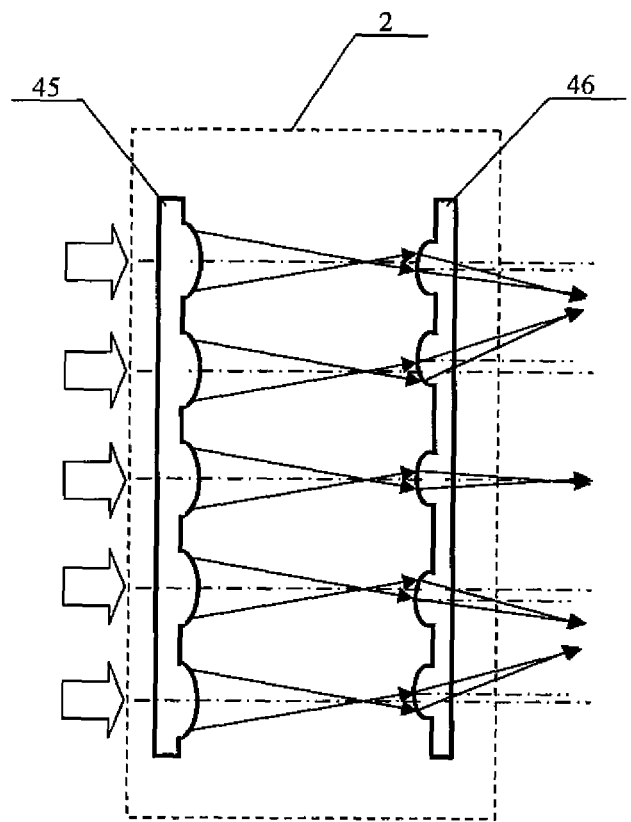
FIG. 8 is a schematic diagram of an embodiment of random-secondary-light-source-generator-array using two micro-lens-arrays.

FIG. 8 is a schematic diagram of a random-secondary-light-source-generator-array using two micro-lens-arrays. It comprises the first micro-lens-array 45 on which the micro-lens are of a periodical distribution; the second micro-lens-array 46 on which the micro-lens are of a uniform random distribution disposed in parallel with the first micro-lens-array 45 and aligned with the first micro-lens-array 45 so that the focused beam created by each micro-lens of the first micro-lens-array 45 illuminates one micro-lens of the second micro-lens-array 46 and the image focus of each micro-lens of the first micro-lens-array 45 falls within one focal length of the micro-lens of the second micro-lens-array 46. A parallel light beam incident on micro-lens-array 45 is first focused at the focus of each micro-lens of micro-lens-array 45. Next it is magnified by each micro-lens of micro-lens-array 46. The vertical magnification ratio is of a random distribution since the optic axis of each micro-lens of micro-lens-array 46 is randomly distributed relative to the optic axis of each micro-lens of the first micro-lens-array 45. The new secondary light sources obtained is therefore of a random distribution. The micro-lens-arrays 45 and 46 may be fabricated on the opposite sides of the same plate to avoid later tedious assembling work. The random-secondary-light-source-generator-array 2 illustrated in FIG. 8 might also be used to couple two liquid crystal panels to eliminate possible interferences of adjacent pixels due to diffraction.

Figure 9:
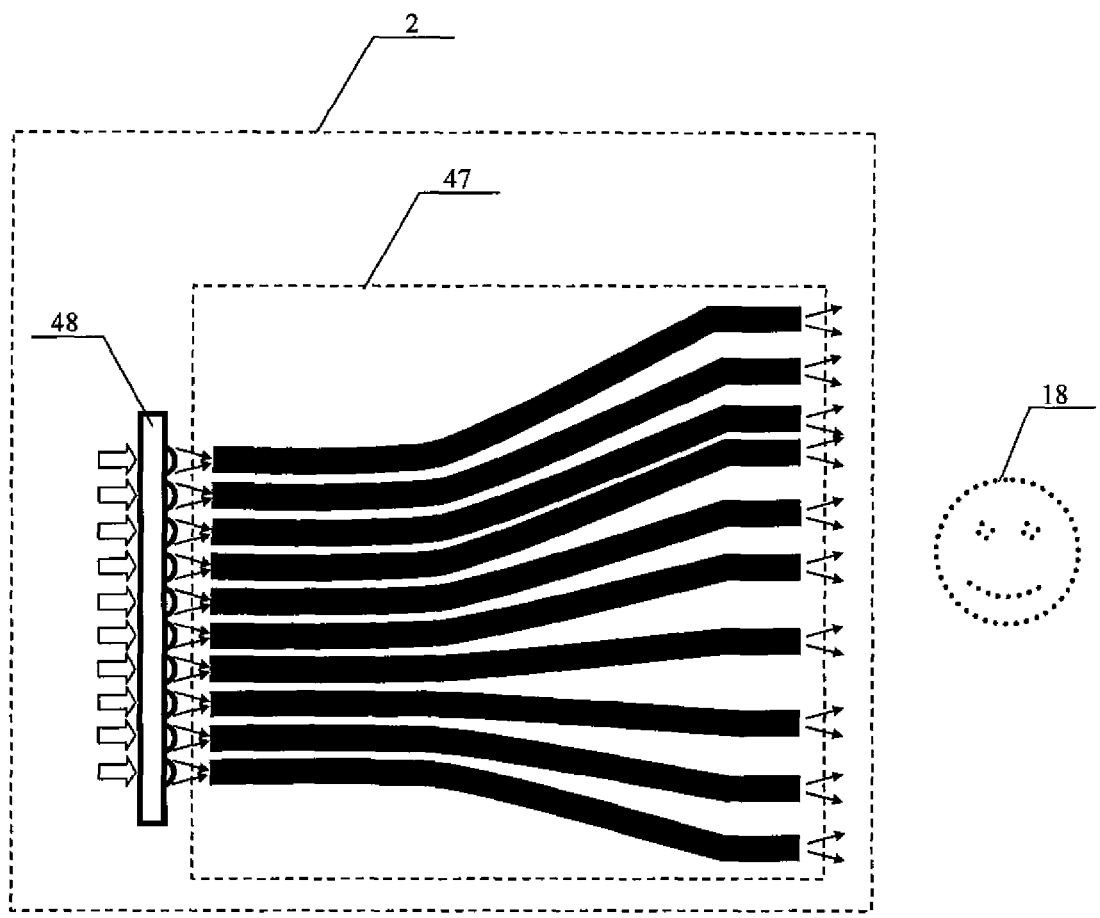
FIG. 9 is a schematic diagram of an embodiment of random-secondary-light-source-generator-array using a bundle of single-mode fibers.

FIG. 9 is a schematic diagram of a random-secondary-light-source-generator-array 2 using a bundle of single-mode fibers. It comprises a bundle of single-mode fibers 47 and a micro-lens-array 48. The single-mode fibers within the bundle 47 are optically isolated from each other. They are glue together and polished at the left end. A micro-lens-array 48 is disposed to focus the light from illuminating optic system into the cores of the single-mode fibers within the bundle 47 at the left end. One micro-lens in the micro-lens-array 48 is aligned with one single-mode fiber. The light exit from the right ends of the single-mode fibers and propagate towards 3-D image 18. At the right end the spaces between adjacent single-mode fibers are of a random distribution.

What is claimed is:

1. A 3-D display method based on random source constructive interference performed by a processor to prepare data for a 3D screen according to the following steps, said 3D screen contains a number of 3D pixels, whose $i^{th}$ 3D-pixel has a primary amplitude $A_{0j}$, a primary phase $\Phi_{0j}$ and is located randomly at position $R_j$:

A.: Read in a monochrome discrete 3D image, said monochrome discrete 3D image consists of M discrete voxels with $m^{th}$ voxel located at a position $r_m$, m=1, 2 . . . M;

B.: Pick up one voxel m from M voxels readied in step A;

C.: Select randomly N 3D pixels from sad 3D screen;

D.: For each 3D-pixel j selected in step C, calculate a phase difference $\Phi_{cj}$, $m=k_{j,\,m}\cdot(r_m-R_j)$, where $k_{j,\,m}$ is a wave vector of light emitted from said 3D-pixel j toward said voxel m picked up in step B, and take the phase difference $\Phi_{cj,\,m}$ as a phase adjustment that should be performed by said 3D-pixel j to generate said voxel m;

E.: For each 3D-pixel j in step C, set a constant $A_{cj,\,m}$ as an amplitude adjustment it should make to generate said voxel m picked up;

F.: For each discrete voxel m readied in step A, repeat step B through step E, record said amplitude adjustment $A_{cj,\,m}$ and said phase adjustment $\Phi_{cj,\,m}$; for each 3D-pixel j in way of complex-amplitude addition, sum up all the recorded amplitude adjustment $A_{cj,\,m}$ and phase adjustment $$\Phi_{cj,m},\,A_{cj}=\sum_{m=1}^{m=M}Acj,$$

m exp ($\Phi cj$, m)=$A_{cj}$ exp($\Phi_{cj}$) and take resulting complex amplitudes $A_{cj}$'s amplitude $A_{cj}$ and phase $\Phi_{cj}$ respectively as a total amplitude adjustments and a total phase adjustment it should make;

G.: For each 3D-pixel j, calculate a final phase adjustment $\Phi_j$ by subtracting said primary phase $\Phi_{0j}$ from said total phase adjustment $\Phi_{cj}$ determined in step F, $\Phi_j=\Phi_{cj}-\Phi_{0j}$ and use said total amplitude adjustment $A_{cj}$ determined in step F as a final amplitude adjustment $A_j$, $A_j=A_{cj}$; said final phase adjustment $\Phi_j$ and final amplitude adjustment $A_j$ are data needed for said 3D screen to control each 3D-pixel's phase and amplitude to display said monochrome discrete 3D image read in step A.

2. The method of claim 1, where in step C, said number N of randomly selected 3-D pixels is proportional to an intensity of said voxel m picked up in step B.

3. The method of claim 1, where in step E, set said amplitude adjustment $A_{cj, m}$ proportional to an intensity of said voxel m picked up in step.

4. The method of claim 1, where in step G: set a final amplitude adjustment $A_j$ as said total amplitude adjustment $A_{cj}$ determined in step F divided by said primary amplitude $A_{0j}$, $A_j=A_{cj}/A_{0j}$.

5. A 3D-screen for 3D display based on random source constructive interference bearing 3D-pixels required in claim 1, which comprises at least four components list below:
  (1). a coherent light source that emits coherent light;
  (2). an illuminating optic system disposed to receive the coherent light and emit an expanded coherent light beam;
  (3). an amplitude-phase-modulator-array disposed to receive and modulate the expanded coherent light beam; each amplitude-phase-modulator in said amplitude-phase-modulator-array independently modulates a fraction of said expanded coherent light beam to electrically change its amplitude and phase;
  (4). a random-secondary-light-source-generator-array disposed and aligned with the amplitude-phase-modulator-array so that one random-secondary-light-source-generator in said random-secondary-light-source-generator-array receives light modulated by one amplitude-phase-modulator in the amplitude-phase-modulator-array and generates a 3D-pixel with random position; all of said 3D-pixels together form a 3D-screen required in claim 1;
  said illuminating optic system comprises two convex lenses with different focal lengths, the convex lens with smaller focal length being disposed to receive the light emitted from said coherent light source, the convex lens with larger focal length being disposed with its object focus at the image focus of the convex lens with smaller focal length to form a telescope and to emit an expanded light beam;
  said amplitude-phase-modulator-array uses two projection type spatial light modulators working in phase-mostly mode, two projection type spatial light modulators being aligned with each other so that their pixels' images overlap after projection and perform amplitude and phase modulation in way of vector addition;
  said random-secondary-light-source-generator-array adopts one of following three forms:
    (a). said random-secondary-light-source-generator-array comprises a micro-lens-array disposed by or fabricated on a transparent plate covered with an opaque film bearing transparent micro-holes whose positions are of a uniform random distribution, each micro-hole's diameter being smaller than projected images of pixels of said projection type spatial light modulators, each micro-lens in the micro-lens-array being aligned with each micro-hole on the opaque film so that each micro-lens's optic axis passes a center of a micro-hole it aligned with;
    (b). said random-secondary-light-source-generator-array comprises a first micro-lens-array on which micro-lens are of a periodical distribution; a second micro-lens-array on which micro-lens are of a uniform random distribution disposed in parallel with the first micro-lens-array and aligned with the first micro-lens-array so that a focused light emitted from each micro-lens of the first micro-lens-array illuminates one micro-lens of the second micro-lens-array and an image focus of each micro-lens of the first micro-lens-array falls within one focal length of one micro-lens of the second micro-lens-array;
    (c). said random-secondary-light-source-generator-array comprises a bundle of optically isolated single-mode fibers fabricated so that the single-mode fibers within the bundle are glue or fused together and polished at a first end and spaces between adjacent single-mode fibers are of a random distribution at a second end; a micro-lens-array disposed to receive and focus light into cores of the single-mode fibers at the first end, one micro-lens in the micro-lens-array being aligned with one single-mode fiber.

6. The 3-D screen of claim 5, wherein said amplitude-phase-modulator-array comprising: the first polarizer disposed to receive said expanded light beam from illuminating optic system and to emit a polarized light beam; a first beam splitter disposed to receive the polarized light beam and to split it into two equal light beams; two reflectors disposed to receive the two equal light beams and reflect them normally onto two projection type transmission liquid crystal spatial light modulators respectively; two transmission liquid spatial light modulators together with the second beam splitter disposed to form a Michelson interferometer with one transmission liquid crystal spatial light modulator placed at an angle of 45 degree to the second beam splitter's half-reflect-half-transmit surface and in mirror symmetry with another transmission liquid crystal spatial light modulator relative to the second beam splitter's half-reflect-half-transmit surface; the second beam splitter disposed to receive the light beams modulated by two transmission liquid crystal spatial light modulators and to combine them to form an integrated light beam; a second polarizer disposed in parallel with one of the two liquid crystal spatial light modulators to receive normally the integrated light beam formed by the second beam splitter, the first and the second polarizer's polarization directions being rotated to set the two liquid crystal spatial light modulators in phase-mostly mode; a projection lens disposed to receive the polarized light emitted from the second polarizer and to form a magnified real image of the two liquid crystal spatial light modulators.

7. The 3-D screen device of claim 5, wherein the amplitude-phase-modulator-array comprising: the first polarizer disposed to receive the expanded light beam from illuminating optic system and to emit a polarized light beam; a beam splitter disposed to receive the polarized light beam and to split it into two equal light beams; two reflective liquid crystal spatial light modulators disposed to receive normally the two equal light beams respectively and reflect them back, the reflective liquid crystal spatial light modulators together with the beam splitter disposed to form a reflective Michelson interferometer with one reflective liquid crystal spatial light modulator placed at an angle of 45 degree to the beam splitter's half-reflect-half-transmit surface and in mirror symmetry with another reflective liquid crystal spatial light modulator relative to the beam splitter's half-reflect-half-transmit surface, the beam splitter being disposed also to receive the light beams modulated by the reflective liquid crystal panels and to combine them to form an integrated light beam; the second polarizer disposed in parallel with one of the two reflective liquid crystal spatial light modulators to receive normally the integrated light beam formed by the beam splitter, the polarization directions of the first and the second polarizer's polarization directions being rotated to set two reflective liquid crystal spatial light modulators in phase-mostly mode; an projection lens disposed to receive the polarized light emitted from the second polarizer and to form a magnified real image of two reflective liquid crystal spatial light modulators.

8. The 3-D device of claim 5, wherein said amplitude-phase-modulator-array comprising: a first polarizer disposed to receive said expanded light beam from illuminating optic system and to emit a polarized light beam; a beam splitter disposed to receive the polarized light beam and to split it into two equal light beams; two liquid crystal light valves disposed to receive normally the two equal light beams respectively and reflect them back, two liquid crystal light valves together with the beam splitter disposed to form a reflective Michelson interferometer with one liquid crystal light valve placed at an angle of 45 degree to the beam splitter's half-reflect-half-transmit surface and in mirror symmetry with another liquid crystal light valve relative to the beam splitter's half-reflect-half-transmit surface, the beam splitter being disposed also to receive the light beams modulated by the liquid crystal light valves and to combine them to form an integrated light beam; a second polarizer disposed in parallel with one of the two liquid crystal light valves to receive normally the integrated light beam formed by the beam splitter, the first and the second polarizer's polarization directions being rotated to set two liquid crystal light valves in phase-mostly mode; an projection lens disposed to receive the polarized light emitted from the second polarizer and to form a magnified real image of two liquid crystal light valves;

two digital-mirror-devices disposed behind two liquid crystal light valves to project two optic images onto two liquid crystal light valves' backs respectively, an optic image projected onto one liquid crystal light valve's back being in mirror symmetry with the optic image projected onto another liquid crystal light valve's back relative to the beam splitter's half-reflect-half-transmit surface.

9. The 3-D screen of claim 5, wherein said amplitude-phase-modulator-array comprises: a beam splitter disposed to receive the expanded light beam from illuminating optic system and to split it into two equal light beams; two optically-addressed-electro-optic-phase-modulators disposed to receive normally the two equal light beams with their electro-optic material films and reflect them back, two optically-addressed-electro-optic-phase-modulators together with the beam splitter disposed to form a reflective Michelson interferometer with one optically-addressed-electro-optic-phase-modulator placed at an angle of 45 degree to the beam splitter's half-reflect-half-transmit surface and in mirror symmetry with another optically-addressed-electro-optic-phase-modulator relative to the beam splitter's half-reflect-half-transmit surface, the beam splitter being disposed also to combine light beams reflected and modulated by two optically-addressed-electro-optic-phase-modulators to form an integrated light beam; an optic lens disposed to receive the integrated light beam and to form a magnified real image of two optically-addressed-electro-optic-phase-modulators; two digital-mirror-devices disposed behind two optically-addressed-electro-optic-phase-modulators to project two optic images onto optic-sensitive films on two optically-addressed-electro-optic-phase-modulators respectively, an optic image projected onto one optically-addressed-electro-optic-phase-modulator's back being in mirror symmetry with an optic image projected onto another optically-addressed-electro-optic-phase-modulator's back relative to the beam splitter's half-reflect-half-transmit surface;

said optically-addressed-electro-optic-phase-modulator comprises a first film of optic-sensitive material, a second film of opaque material, a third reflective film and a fourth film of electro-optic material, all of them being sandwiched between two transparent conductive glasses in said order.

10. A 3D-screen for 3-D display based on random source constructive interference bearing 3D-pixels required in claim 1, which comprises at least four components list below:
  (1). a coherent light source that emits coherent light;
  (2). an illuminating optic system disposed to receive the coherent light and emit an expanded coherent light beam;
  (3). an amplitude-phase-modulator-array disposed to receive and modulate the expanded coherent light beam; each amplitude-phase-modulator in said amplitude-phase-modulator-array independently modulates a fraction of said expanded coherent light beam to electrically change its amplitude and phase;
  (4). a random-secondary-light-source-generator-array disposed and aligned with the amplitude-phase-modulator-array so that one random-secondary-light-source-generator in said random-secondary-light-source-generator-array receives light modulated by one amplitude-phase-modulator in the amplitude-phase-modulator-array and generates a 3D-pixel with random position; all of said 3D-pixels together form a 3D-screen required in claim 1;

said illuminating optic system comprises two convex lenses with different focal lengths, the convex lens with smaller focal length being disposed to receive the light emitted from said coherent light source, the convex lens with larger focal length being disposed with its object focus at the image focus of the convex lens with smaller focal length to form a telescope and to emit an expanded light beam;

said amplitude-phase-modulator-array comprises a first polarizer disposed to receive the light from illuminating optic system and to emit polarized light; a first transmission liquid crystal panel disposed by the first polarizer; a second polarizer disposed by the first transmission liquid crystal panel; a second transmission liquid crystal panel disposed by the second polarizer; a third polarizer disposed by the second transmission liquid crystal panel, each pixel on the first transmission liquid crystal panel being aligned with one pixel on the second transmission liquid crystal panel, three polarizer's polarization directions being rotated to set one transmission liquid crystal panel in phase-mostly mode and another transmission liquid crystal panel in amplitude-mostly mode to perform amplitude and phase modulation in way of vector multiplication;

said random-secondary-light-source-generator-array adopts one of following three forms:
  (a). said random-secondary-light-source-generator-array comprises a micro-lens-array disposed by or fabricated on a transparent plate covered with an opaque film bearing transparent micro-holes whose positions are of a uniform random distribution, each micro-hole's diameter being smaller than pixels of said liquid crystal panels, each micro-lens in the micro-lens-array being aligned with each micro-hole on the opaque film so that each micro-lens's optic axis passes a center of a micro-hole it aligned with;

(b). said random-secondary-light-source-generator-array comprises a first micro-lens-array on which micro-lens are of a periodical distribution; a second micro-lens-array on which micro-lens are of a uniform random distribution disposed in parallel with the first micro-lens-array and aligned with the first micro-lens-array so that a focused light emitted from each micro-lens of the first micro-lens-array illuminates one micro-lens of the second micro-lens-array and an image focus of each micro-lens of the first micro-lens-array falls within one focal length of one micro-lens of the second micro-lens-array;

(c). said random-secondary-light-source-generator-array comprises a bundle of optically isolated single-mode fibers fabricated so that the single-mode fibers within the bundle are glue or fused together and polished at a first end and spaces between adjacent single-mode fibers are of a random distribution at a second end; a micro-lens-array disposed to receive and focus light into cores of the single-mode fibers at the first end, one micro-lens in the micro-lens-array being aligned with one single-mode fiber.

11. The 3-D screen of claim 10 wherein pixels on two transmission liquid crystal panels are of an identical uniform random distribution.

\* \* \* \* \*